(12) United States Patent
Corless et al.

(10) Patent No.: US 8,684,876 B2
(45) Date of Patent: *Apr. 1, 2014

(54) DIFFERENTIAL ASSEMBLY WITH FEATURES FOR IMPROVED LUBRICATION

(71) Applicant: American Axle & Manufacturing, Inc., Detroit, MI (US)

(72) Inventors: Daniel G. Corless, Allen Park, MI (US); Mark A. Harnden, Shelby Township, MI (US); Mark S. Waack, White Lake, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,860

(22) Filed: Jun. 28, 2013

(65) Prior Publication Data

US 2013/0281251 A1    Oct. 24, 2013

Related U.S. Application Data

(63) Continuation of application No. 12/963,761, filed on Dec. 9, 2010, now Pat. No. 8,475,314.

(60) Provisional application No. 61/299,252, filed on Jan. 28, 2010.

(51) Int. Cl.
*F16H 57/04* (2010.01)
(52) U.S. Cl.
USPC ......... 475/160; 184/11.1; 184/13.1; 184/6.12
(58) Field of Classification Search
USPC .................. 475/160; 184/11.1, 13.1, 6.12
See application file for complete search history.

(56) References Cited

U.S. PATENT DOCUMENTS

| | | | |
|---|---|---|---|
| 397,293 | A | 2/1889 | Ide |
| 1,775,623 | A | 9/1930 | Morgan |
| 2,015,108 | A | 9/1935 | Harper |
| 2,053,929 | A | 9/1936 | Wiedmaier |
| 3,138,222 | A | 6/1964 | Dames |
| 3,182,527 | A | 5/1965 | Bryan |
| 3,441,106 | A | 4/1969 | Taylor et al. |
| 3,532,183 | A | 10/1970 | Shealy |
| 3,785,458 | A | 1/1974 | Caldwell et al. |
| 3,952,953 | A | 4/1976 | Eby |
| 3,955,762 | A | 5/1976 | Cassimatis et al. |
| 4,280,562 | A | 7/1981 | Glinecke |
| 4,296,815 | A | 10/1981 | Mears |
| 4,570,860 | A | 2/1986 | Aprea et al. |
| 5,839,327 | A | 11/1998 | Gage |
| 6,135,241 | A | 10/2000 | Ganguly et al. |
| 6,155,135 | A | 12/2000 | Gage et al. |
| 6,267,203 | B1 | 7/2001 | Brissette et al. |
| 6,432,018 | B1 | 8/2002 | Morse et al. |

(Continued)

*Primary Examiner* — Sherry Estremsky
(74) *Attorney, Agent, or Firm* — Harness, Dickey & Pierce, P.L.C.

(57) ABSTRACT

A power transmitting component includes a housing having an interior cavity with a sump, a lubricant disposed in the sump, and a component mounted in the housing assembly for rotation about a first axis. The component rotates through the lubricant in the sump to generate a stream of lubricant that is slung from the component as it rotates at a speed in excess of a predetermined speed. The housing includes a deflector that extends into the interior cavity and has a first face having an impingement portion and a first edge adjacent the impingement portion. The impingement portion extends into the stream and deflects a portion of the stream towards the first edge. The first edge disperses the portion of the stream toward selected areas in the interior cavity.

18 Claims, 11 Drawing Sheets

(56) References Cited

U.S. PATENT DOCUMENTS

| | | |
|---|---|---|
| 6,450,296 B1 | 9/2002 | Seki et al. |
| 6,604,608 B2 | 8/2003 | Fegg |
| 7,025,701 B2 | 4/2006 | Cui et al. |
| 7,189,178 B2 | 3/2007 | Weith |
| 7,461,720 B2 | 12/2008 | Min |
| 8,109,174 B2 | 2/2012 | Hilker et al. |
| 8,152,675 B2 | 4/2012 | Altvaten et al. |
| 2009/0023531 A1 | 1/2009 | Hilker et al. |
| 2010/0043594 A1 | 2/2010 | Hilker et al. |
| 2010/0048341 A1 | 2/2010 | McKenna |
| 2010/0105513 A1 | 4/2010 | Hilker et al. |
| 2010/0144480 A1 | 6/2010 | Downs et al. |

DIFFERENTIAL ASSEMBLY WITH FEATURES FOR IMPROVED LUBRICATION

CROSS-REFERENCE TO RELATED APPLICATIONS

This application is a continuation of U.S. application Ser. No. 12/963,761 filed Dec. 9, 2010, which claims the benefit of U.S. Provisional Application No. 61/299,252, filed on Jan. 28, 2010. The entire disclosure of the above applications is incorporated herein by reference as if fully set forth in detail herein.

FIELD

The present disclosure relates to an axle assembly and, more particularly, to a differential assembly with features for improved lubrication.

BACKGROUND

The statements in this section merely provide background information related to the present disclosure and may not constitute prior art.

An axle assembly for a motor vehicle includes internal moving parts that generate heat during operation of the axle assembly. It is desirable that heat generated in the axle assembly during its operation be controlled, as excessive heat could cause premature breakdown of the lubricant within the axle assembly, which in turn can reduce the life of the internal parts.

Some conventional axle assemblies employ the housing of the axle assembly to reject heat. In this regard, lubricant within the axle assembly is typically splashed by a ring gear onto the various gears within the axle assembly and heat from the gears is absorbed by the lubricant. The heated lubricant may collect in a sump, where some of the heat is transmitted to the housing. The housing can in turn reject the heat to the surrounding air, particularly the portion of the housing proximate to the sump. In addition, the heated lubricant collecting in the sump can be splashed onto the housing in areas outside of the sump. Heat from the splashed lubricant is transmitted to the housing of the axle assembly, which can then reject heat to the surrounding air.

We have found, however, that it would be desirable in some situations to provide additional lubrication to one or more areas of the axle assembly that are more distant from the ring gear.

SUMMARY

The present teachings provide an axle assembly including an axle housing assembly including a housing structure having an interior cavity with a sump; a lubricant disposed in the sump having a liquid lubricant level; and a differential mounted in the axle housing assembly for rotation about a first axis, the differential including a ring gear, the ring gear generating an annular stream of lubricant adjoining the ring gear above the liquid lubricant level during operation of the differential at a rotational speed greater than a predetermined rotational speed; wherein the housing structure includes an interior surface on which a deflector is coupled, the deflector extending into the interior cavity and having a first face having an impingement portion and a first edge adjacent the impingement portion, the impingement portion extending into the stream and deflecting a portion of the stream towards the first edge, the first edge dispersing the portion of the stream away from the interior surface into the cavity.

In further features, the deflector may include a tab-like structure extending into the interior cavity. The deflector may be a six-sided structure having one of six sides coupled to the interior surface. In still further features, the deflector may disperse the portion of the stream into a spray. The spray may have a fan-shaped spray pattern. The spray pattern may extend in a direction parallel to the first axis.

In yet further features, the first face may include a flat surface. The flat surface may define a plane that extends parallel to the first axis. In yet further features, the first edge may extend parallel to the first axis. The first edge may include an arcuate portion extending from the first face. In yet further features, the deflector may extend along a radial line extending through the first axis.

The present teachings also provide an axle assembly including an axle housing assembly including a housing structure having an interior cavity with a sump; a lubricant disposed in the sump having a liquid lubricant level; and a differential mounted in the axle housing assembly for rotation about a first axis, the differential including a ring gear, the ring gear generating an annular stream of lubricant adjoining the ring gear above the liquid lubricant level during operation of the differential at a rotational speed greater than a predetermined rotational speed; a first deflector means including a first face extending into the stream and directing a portion of the stream in a first path along the first face transverse to a second path of the portion of the stream when the stream first comes into contact with the first face; and a second deflector means including an edge adjoining the first face, the edge dispersing the portion of the stream away from the interior surface into the cavity.

In further features, the second deflector means may disperse the portion of the stream into a spray. In still further features, the first and second deflector means may be coupled to an interior surface of the housing structure. In still further features, the first and second deflector means are formed integral with the housing structure.

The present teachings further provide a method for lubricating a differential mounted in a housing structure of an axle assembly. The method includes generating a stream of lubricant above a liquid lubricant level of a lubricant disposed in a sump of the housing structure by rotating a ring gear of the differential through the lubricant at a rotational speed greater than a predetermined rotational speed; deflecting a portion of the stream in a first path along a first face of a deflector coupled to an interior surface of the housing structure, the first face extending into the stream, the first path being transverse to a second path of the portion of the stream when the stream first impinges the first face; and dispersing the portion of the stream away from the interior surface using an edge of the deflector adjoining the first face after the deflecting.

In further features, the dispersing may include dispersing the portion of the stream into a spray. The spray may have a fan-shaped pattern. The pattern may extend in a direction parallel to a first rotational axis of the differential. In still further features, the dispersing includes directing the portion of the stream towards the differential.

In yet another form, the present teachings provide a power transmitting component that includes a housing, a lubricant, and an assembly. The housing has an interior cavity and a deflector. The interior cavity has a sump. The deflector extends into the interior cavity and has a first face with an impingement portion and a first edge that is adjacent the impingement portion. The lubricant is disposed in the sump. The assembly is received in the housing and is rotatable in the interior cavity about a first axis. The assembly includes a component that travels through the lubricant as the assembly rotates within the housing. The impingement portion of the deflector is sized and positioned to extend into a stream of lubricant that is slung from the component as it rotates at a speed in excess of a predetermined speed. The impingement portion is configured to deflect a portion of the stream towards the first edge. The first edge is configured to disperse at least a portion of the portion of the stream to one or more selected areas within the interior cavity.

In a further form, the present teachings provide a method for lubricating an assembly that is rotatably in a housing of a power transmitting component. The method includes: rotating the assembly in the housing such that a component of the assembly rotates through a lubricant in a sump to generate a stream of lubricant that is slung from the component as the component rotates at a rotational speed that is greater than a predetermined rotational speed; deflecting a portion of the stream in a first path along a first face of a deflector coupled toward an interior surface of the housing, the first face extending into the stream, the first path being transverse to a second path of the portion of the stream when the stream first impinges the first face; and dispersing the portion of the stream into a spray with an edge of the deflector that adjoins the first face.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
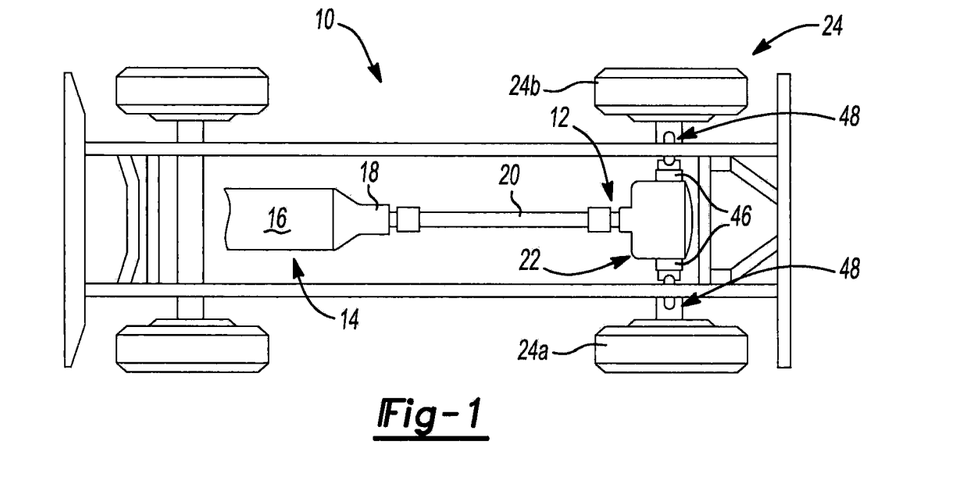
FIG. 1 is a schematic illustration of an exemplary vehicle having an axle assembly constructed in accordance with the teachings of the present disclosure.

With reference to FIG. 1 of the drawings, a vehicle having an axle assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24.

The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportioned in a predetermined manner to the left and right rear wheels 24a and 24b, respectively.

Figure 2:
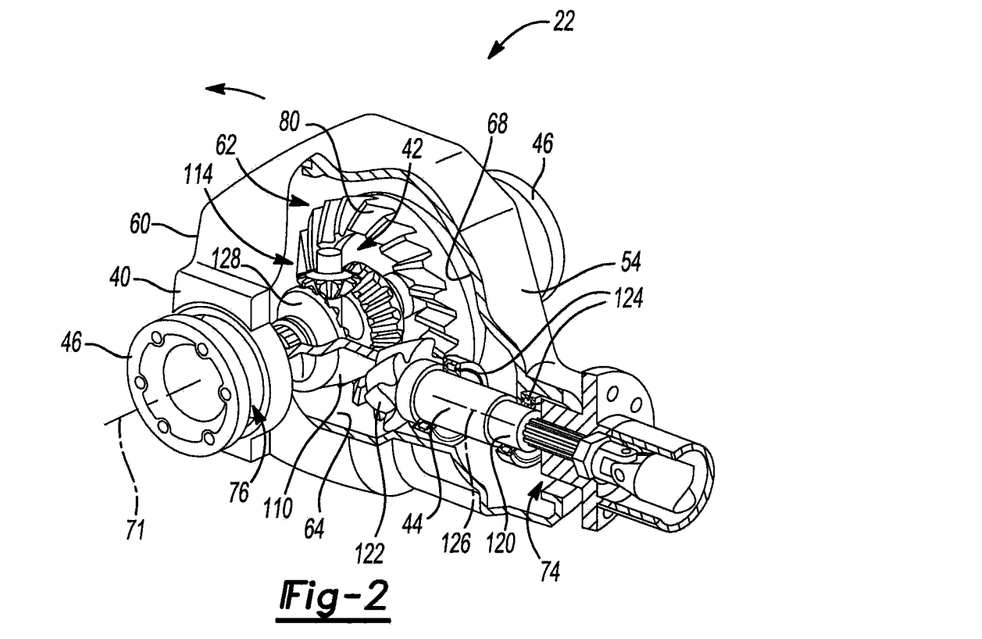
FIG. 2 is a partially broken away perspective view of a portion of the vehicle of FIG. 1 illustrating the axle assembly in more detail.
Figure 3:
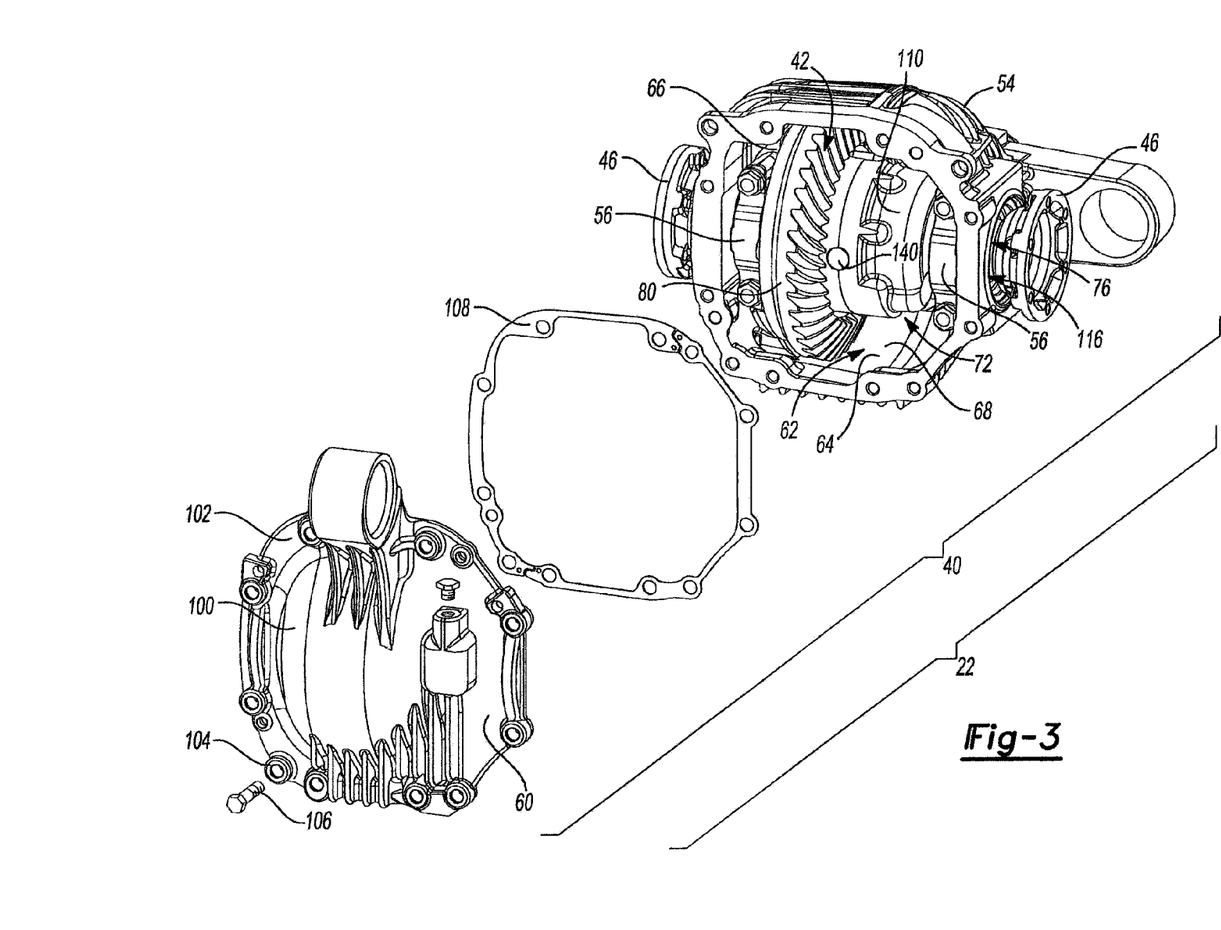
FIG. 3 is an exploded perspective view of a portion of the axle assembly of FIG. 1.

With reference to FIGS. 2 and 3, the rear axle 22 can include an axle housing assembly 40, a differential 42, an input pinion assembly 44, and a pair of primary axle shafts 46 connected to the wheels 24 (FIG. 1) by a pair of intermediate shaft assemblies 48 (FIG. 1). In the particular example provided, the axle housing assembly 40 includes a carrier housing 54, a pair of bearing caps 56, and a cover 60. The axle housing assembly 40 can define an internal cavity 62 that forms a fluid sump 64 in which a liquid lubricant for lubricating the differential 42 and the input pinion assembly 44 is located.

Figure 4:
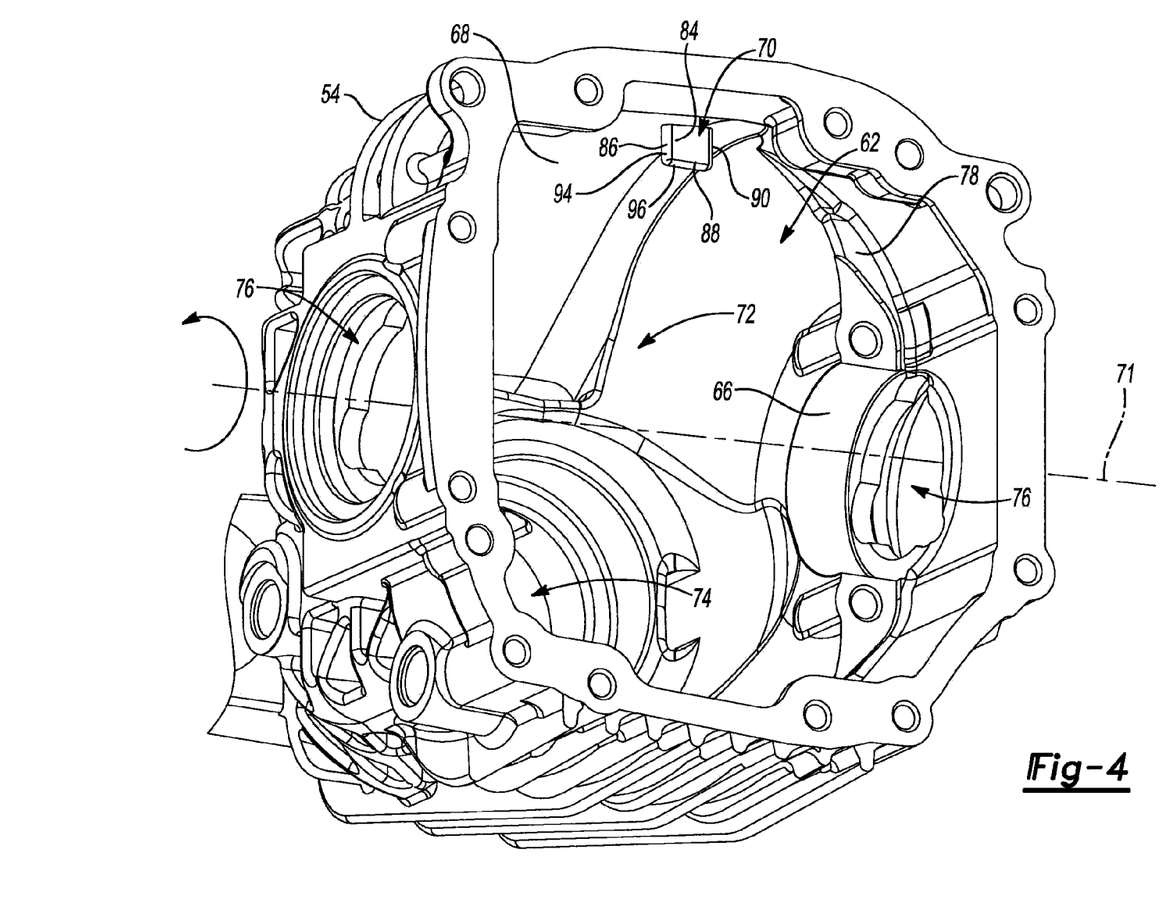
FIG. 4 is a perspective view of a portion of the axle assembly of FIG. 1 illustrating a carrier housing in more detail.

With reference to FIGS. 3 and 4, the carrier housing 54 can include a pair of bearing journals 66, an interior surface 68, and a fluid deflector 70. The bearing journals 66 can cooperate with the bearing caps 56 and can support the differential for rotation about a first rotational axis 71. The interior surface 68 can define a differential aperture 72, which can be disposed on a first side of the carrier housing 54, a pinion aperture 74, which can be disposed on a second side of the carrier housing 54 opposite the differential aperture 72, and a pair of axle shaft apertures 76 that can intersect the opposite lateral sides of the internal cavity 62. The interior surface 68 can further define channels for directing lubricant flung onto the interior surface 68 to predetermined areas of the interior surface 68 adjacent various components of the differential 42. In the particular example provided, the interior surface 68 defines a channel 78 for directing lubricant to an area proximate one of the bearing journals 66.

With reference to FIGS. 4, 6, 7, and 8, the fluid deflector 70 can be coupled to the carrier housing 54 in a desired manner (e.g., integrally formed with the carrier housing 54, fastened to the carrier housing 54) and can extend from the interior surface 68 into the interior cavity 62 proximate a ring gear 80 of the differential 42. The fluid deflector 70 can provide an abrupt change in the contour of the interior surface 68 and, in the particular example provided, the fluid deflector 70 is a tab-like structure protruding from the interior surface 68. The fluid deflector 70 includes an impingement surface 84 extending between a first lateral side 86 and a dispersion edge 88 that defines a departure from the impingement surface 84, as will be explained in more detail below. The fluid deflector 70 can be a generally flat, tab-like structure extending along a radial line extending through the first rotational axis 71 of the differential 42, such as in the example provided. Alternately or additionally, the fluid deflector can be formed in a more complex manner to include an arcuate structure and/or multi-faced impingement surface 84, first lateral side 86, and dispersion edge 88.

The fluid deflector 70 can include at least one impingement surface 84 extending between the interior surface 68 and the dispersion edge 88 and between the first lateral side 86 and a second lateral side 90. The impingement surface 84 can have a first contour configured to direct a first portion of a stream of fluid generated by the ring gear 80 between the first lateral side 86 and the dispersion edge 88. The first contour can have a shape that varies between the first lateral side 86 and the dispersion edge 88. Alternately, the impingement surface 84 can have a generally flat contour between the first lateral side 86 and the dispersion edge 88, such as in the particular example provided. In the example provided, the impingement surface 84 defines a plane (not shown) that extends parallel to the first rotational axis 71. An included angle 92 formed between the interior surface 68 and the impingement surface 84 can be around, but is not limited to around ninety (90) degrees.

The first lateral side 86 can adjoin the impingement surface 84 and can have a second contour configured to permit a second portion of the stream of fluid generated by the ring gear 80 not impinging on the impingement surface 84 to pass by with little or no turbulence. The first lateral side 86 can extend linearly from the interior surface 68 to the dispersion edge 88 and can define an arcuate leading edge portion 94 (FIGS. 4 and 8) extending from the impingement surface 84.

Figure 6:
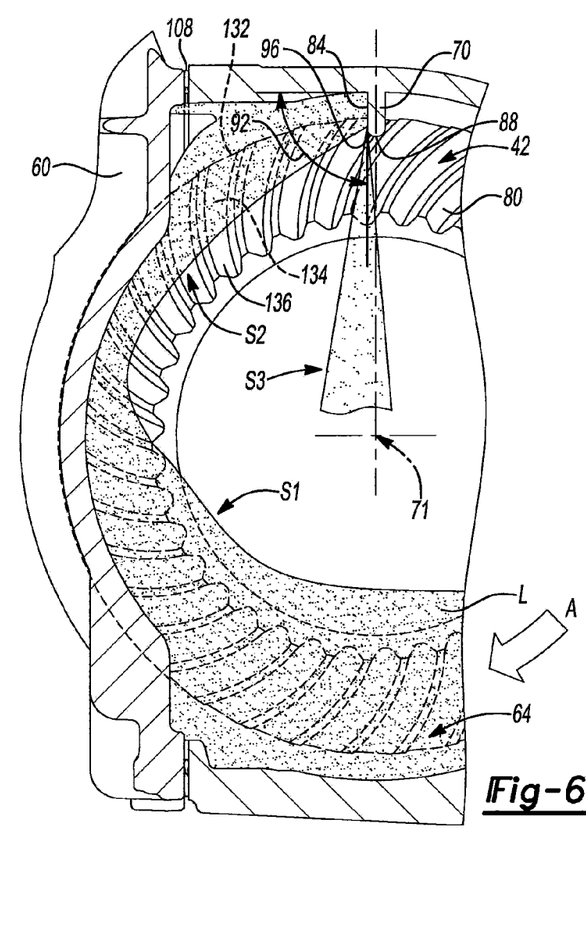
FIG. 6 is a sectional view similar to that of FIG. 5, but illustrating the ring gear in a rotating condition.

The dispersion edge 88 can adjoin the impingement surface 84 at an end of the fluid deflector 70 opposite the interior surface 68. The dispersion edge 88 can have a third contour configured to disperse the first portion of the stream of fluid impinging on the impingement surface 84 into a spray having a fan-shaped pattern, as will be explained in more detail below. The dispersion edge 88 can extend linearly between the first lateral side 86 and the second lateral side 90 and can define an arcuate trailing edge portion 96 extending from the impingement surface 84 (FIGS. 4 and 6). The dispersion edge 88 can extend in a continuous manner, such as in the particular example provided, or in a broken manner to create two or more distinct spray patterns. All or a portion of the dispersion edge 88 can be located outside the stream S2 during operation of the differential 42. An included angle 98 (FIG. 7) between the first lateral side 86 and the dispersion edge 88 can be around, but is not limited to ninety (90) degrees. In the particular example provided, the dispersion edge 88 extends parallel to the first rotational axis 71 of the differential 42, but it will be appreciated that the dispersion edge 88 can be contoured and/or oriented in a desired manner.

The second lateral side 90 can adjoin the impingement surface 84 and can extend from the interior surface 68 to the dispersion edge 88. The second lateral side 90 can have a fourth contour configured to direct part of the first portion of the stream of fluid impinging on the impingement surface 84 along the interior surface 68, as will be explained in more detail below.

The bearing caps 56 can be removably coupled to the bearing journals 66. The cover 60 can include a body portion 100 and a flange portion 102 that can be coupled to the carrier housing 54. The body portion 100 can be three-dimensionally contoured (e.g., bulged outwardly) to effectively increase the volume within the differential axle housing assembly 40 and provide clearance for the ring gear 80 of the differential 42. The flange portion 102 can extend about the body portion 100 and, in the particular example provided, can include a plurality of through holes 104 that permit the cover 60 to be removably coupled to the carrier housing 54 via a plurality of threaded fasteners 106. It will be appreciated that a gasket 108 or a sealant (not shown), such as a room temperature vulcanizing sealant, can be employed to seal the interface between the cover 60 and the carrier housing 54.

The differential 42 can be any appropriate vehicle differential and can conventionally include a case 110, the ring gear 80, which can be rotatably coupled to the case 110, a gearset 114 that can be housed in the case 110, and a pair of bearings 116 that can be coupled to the case 110. The differential 42 can be received into the internal cavity 62 through the differential aperture 72. The bearing journals 66 and the bearing caps 56 can cooperate to support the bearings 116 and thereby support the differential 42 for rotation in the internal cavity 62 about the first rotational axis 71.

The input pinion assembly 44 can conventionally include an input shaft 120 and an input pinion 122 that can be coupled for rotation with the input shaft 120. The input pinion assembly 44 can be received into the carrier housing 54 through the pinion aperture 74 such that the input pinion 122 is meshingly engaged to the ring gear 80. A pair of bearings 124 can be coupled to the carrier housing 54 and the input shaft 120 and can support the input pinion assembly 44 for rotation about a second rotational axis 126 that can be generally perpendicular to the first rotational axis 71. An end of the input shaft 120 opposite the input pinion 122 can be adapted to be coupled to a driveline component, such as the propshaft 20 (FIG. 1), to receive rotary power therefrom.

Each of the axle shafts 46 can be received through an associated one of the axle shaft apertures 76 and can be rotatably supported therein. Each of the axle shafts 46 can be coupled for rotation with an associated side gear 128 in the gearset 114 of the differential 42. Accordingly, it will be appreciated that rotary power input to the rear axle 22 via the input pinion assembly 44 is transmitted through the ring gear 80 to the case 110 and the gearset 114, and output to the axle shafts 46 to provide propulsive power to the left and right rear wheels 24a and 24b (FIG. 1).

Figure 5:
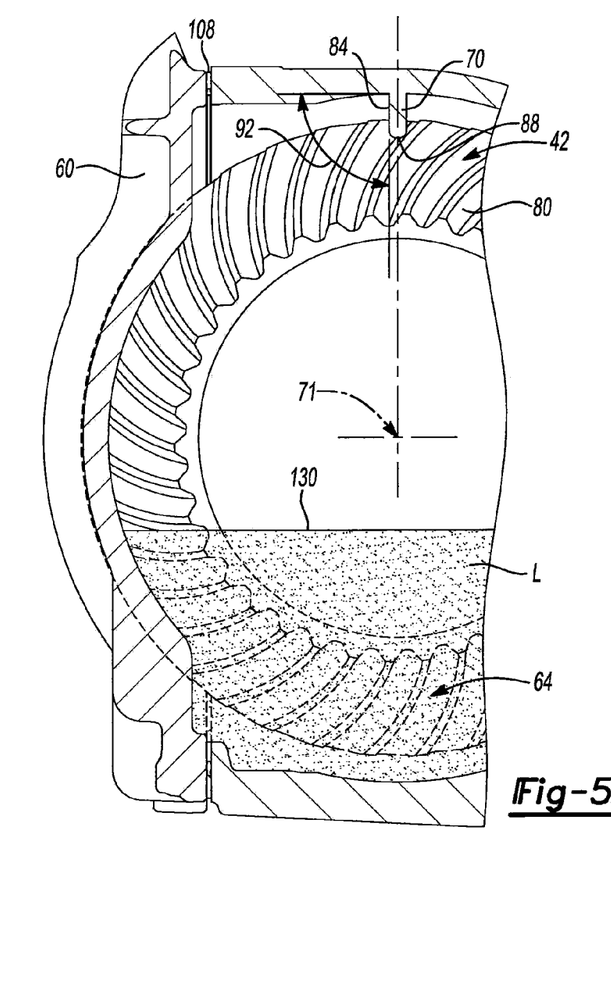
FIG. 5 is a sectional view of a portion of the axle assembly of FIG. 1 illustrating a ring gear associated with a differential in a static (non-rotating) condition.
Figure 7:
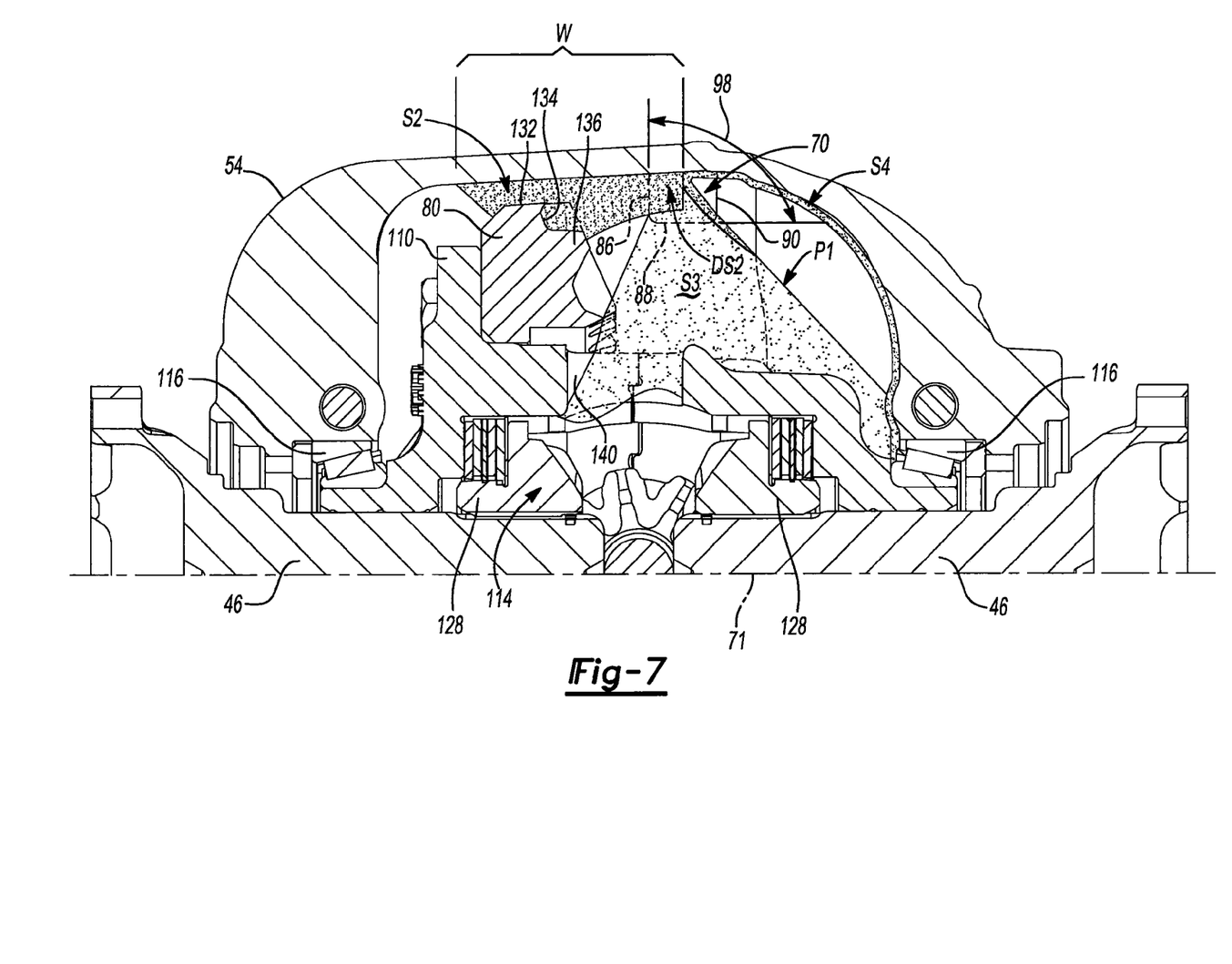
FIG. 7 is a sectional view of a portion of the axle assembly of FIG. 1 illustrating a rotating condition of the ring gear.
Figure 8:
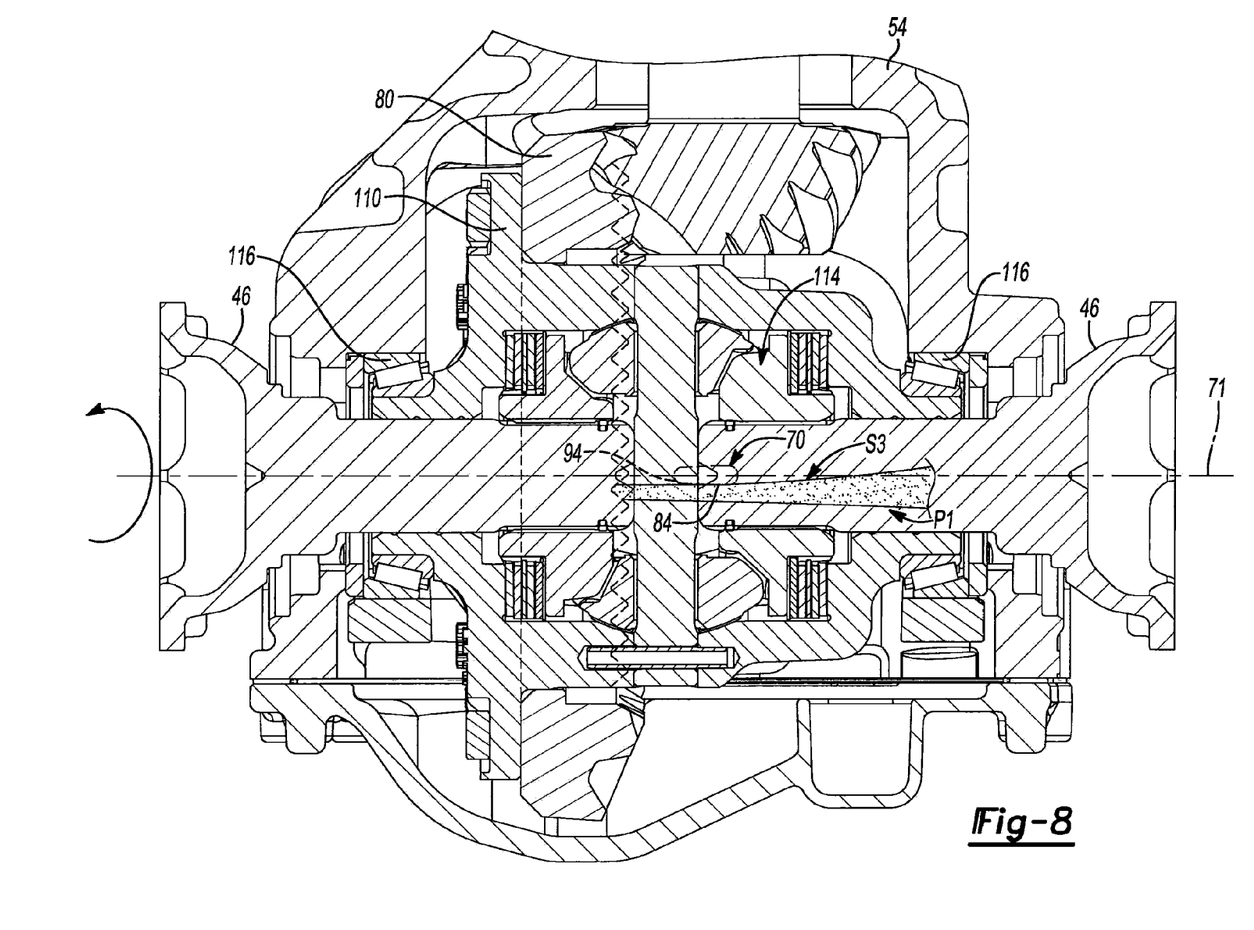
FIG. 8 is a sectional view of a portion of the axle assembly of FIG. 1 illustrating a rotating condition of the ring gear.

With reference to FIG. 5, lubricant L can collect in the sump 64 and define a lubricant level 130 when the differential 42 is not in operation and the ring gear 80 is not rotating. With reference to FIGS. 6, 7, and 8, the ring gear 80, which is partially submerged in the lubricant L collected in the sump 64, can circulate the lubricant L within the internal cavity 62 as the ring gear 80 rotates in the direction of arrow A. Rotation of the ring gear 80 through the lubricant L in the sump 64 can push or drive a portion of the lubricant L generally toward the cover 60 and create a surge S1 in the lubricant level 130 at the cover 60, particularly during lower vehicle speeds and/or lower outside temperatures.

Rotation of the ring gear 80 through the lubricant L in the sump 64 at rotational speeds of the ring gear 80 above a predetermined rotational speed can generate a spout or stream S2 of lubricant flowing in the direction of arrow A and adjoining the ring gear 80. The stream S2 can flow along an arcuate path and can adjoin a circumferential portion 132 of the ring gear 80 and a lateral portion 134 of the ring gear 80 proximate teeth 136. A width W (FIG. 7) of the stream S2 can be proportional to the rotational speed of the ring gear 80.

A portion of the fluid deflector 70 can extend into the stream S2 and can separate and divert a portion DS2 of the stream S2 flowing within the internal cavity 62 away from a remaining portion of the stream S2 that flows past the fluid deflector 70. More specifically, all or part of the portion DS2 of the stream S2 impinging on the impingement surface 84 can be directed to the dispersion edge 88 where the portion DS2 is dispersed into a spray S3. Additionally, part of the portion DS2 can be directed to the second lateral side 90 where the portion DS2 is diverted as a stream S4.

The amount of the fluid in the portion DS2 dispersed into the spray S3 and stream S4 can depend on the speed and the mass flow rate of the fluid in the portion DS2 impinging on the impingement surface 84. The amount of fluid dispersed into the spray S3 and stream S4 can further depend on various features (e.g., geometry) of the fluid deflector 70. Accordingly, it will be appreciated that much, but not all, of the fluid in the portion DS2 may be dispersed in the spray S3. It will be further appreciated that some of the fluid dispersed by the dispersion edge 88 may be in the form of a stream, as shown.

The impingement surface 84 can cooperate with an adjoining portion of the interior surface 68 to direct the portion DS2 of the stream S2 away from the interior surface 68 towards the dispersion edge 88. The impingement surface 84 and interior surface 68 can further cooperate to direct part of the portion DS2 along the interior surface 68 towards the second lateral side 90. The contours of the impingement surface 84 and the dispersion edge 88 can cooperate to disperse the spray S3 away from the interior surface 68 and towards the differential 42. One or more apertures 140 provided in the case 110 can permit a portion of the spray S3 to enter the interior of the case 110 and thereby reach the gearset 114 housed in the case 110.

The spray S3 can have a pattern P1 covering portions of the differential 42, including portions of the case 110 and one of the bearings 116. When viewed along a direction in which the impingement surface 84 faces (FIG. 7), the pattern P1 can have a first fan-like shape that widens with increased distance from the dispersion edge 88. When viewed in a direction along the impingement surface 84 (FIG. 8), the pattern P1 can have a second fan-like shape that also widens with increased distance from the dispersion edge 88. The second fan-like shape may be narrower than and widen less than the first fan-like shape. The spray S3 can extend in a direction generally parallel with the first rotational axis 71 (FIG. 8), such as in the particular example provided.

The stream S4 can be directed towards portions of the differential adjoining the interior surface 68, such as one of the bearings 116, as shown.

Features of the fluid deflector 70 can be selected such that at least a first predetermined amount (e.g., volume) of the stream S2 is diverted by the fluid deflector 70. For example, the fluid deflector 70 can be located a predetermined distance D1 away from the ring gear 80 along the first rotational axis 71 such that a predetermined area of the impingement surface 84 extends into the stream S2 at rotational speeds of the differential 42 above the predetermined rotational speed.

Features of the fluid deflector 70 can also be selected such that at least a second predetermined amount of the portion DS2 of the stream S2 diverted is dispersed in the spray S3. Features of the fluid deflector 70 can further be selected such that the spray S3 has a predetermined shape, orientation, and coverage. For example, a shape and a contour of the predetermined area of the impingement surface 84 extending into the stream S2 may be selected such that at least the second predetermined amount is diverted. The dispersion edge 88 can extend below the stream S2 by a predetermined distance D2 at rotational speeds of the differential 42 above the predetermined rotational speed and can have a predetermined length L.

In various embodiments of an axle assembly constructed in accordance with the teachings of the present disclosure, features of the rear axle assembly 10 and fluid deflector 70 may vary from the features previously discussed. For example, the impingement surface 84 and/or the dispersion edge 88 can be oriented at an angle relative to the first rotational axis 71 when viewed from above (FIG. 8), rather than parallel to the first rotational axis 71. Additionally, the fluid deflector 70 can be laterally offset from the first rotational axis 71 when viewed from above.

Figure 9:
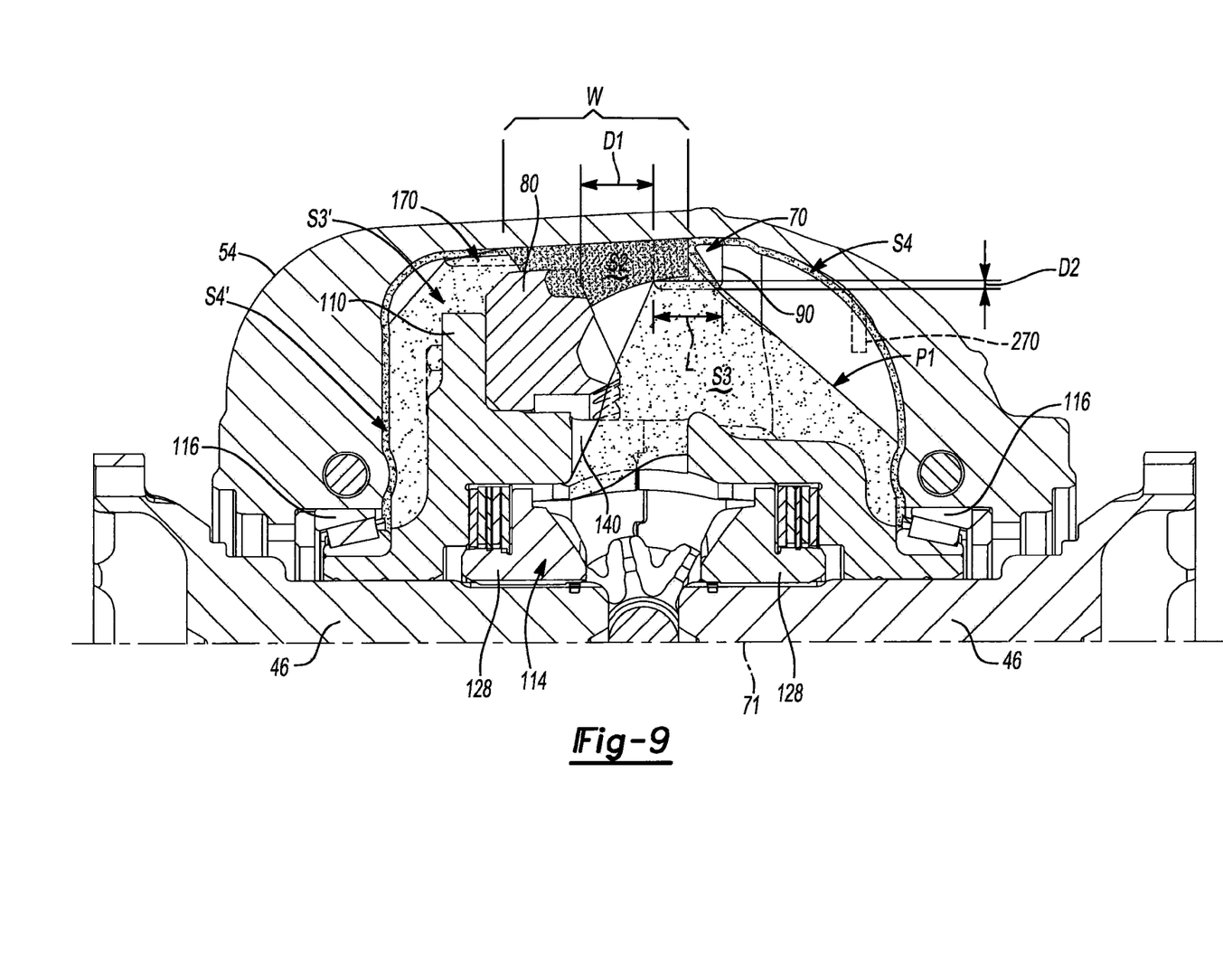
FIG. 9 is a sectional view similar to that of FIG. 7 illustrating a portion of another axle assembly constructed in accordance with the teachings of the present disclosure.
Figure 10:
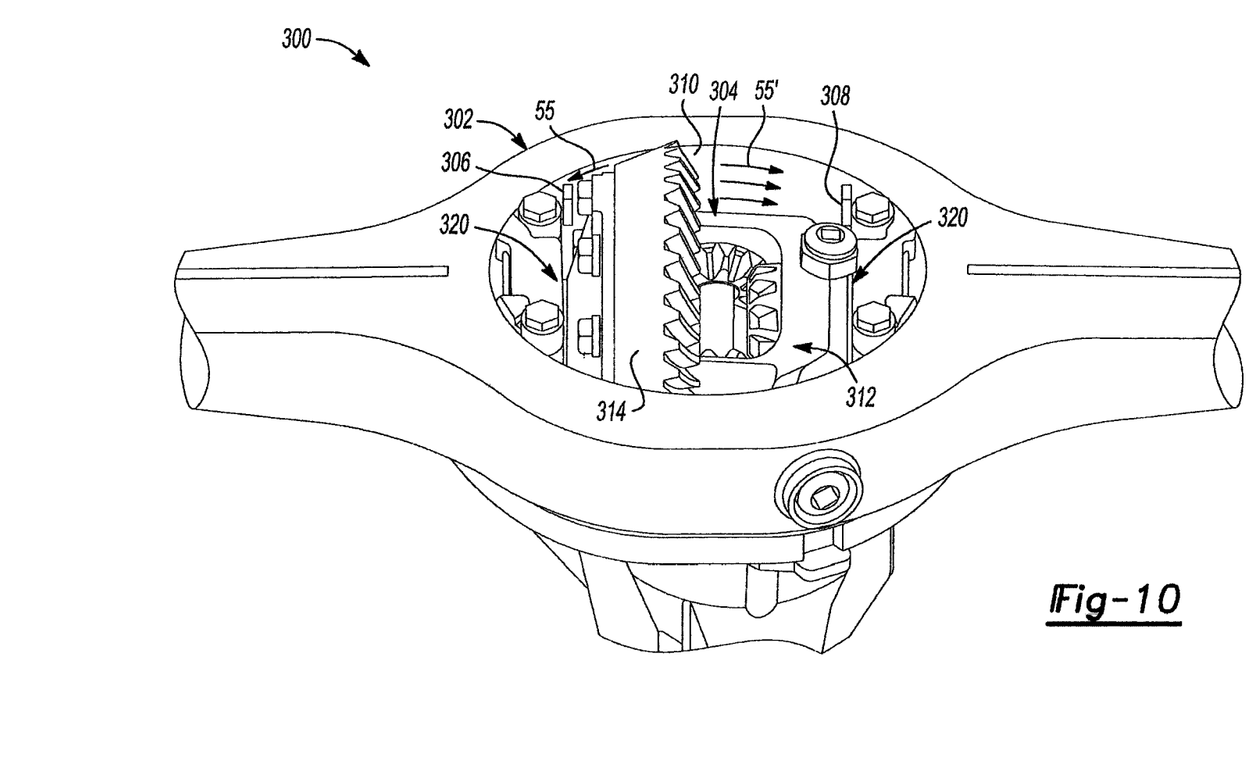
FIGS. 10-13 are perspective views illustrating portions of another axle assembly constructed in accordance with the teachings of the present disclosure.
Figure 11:
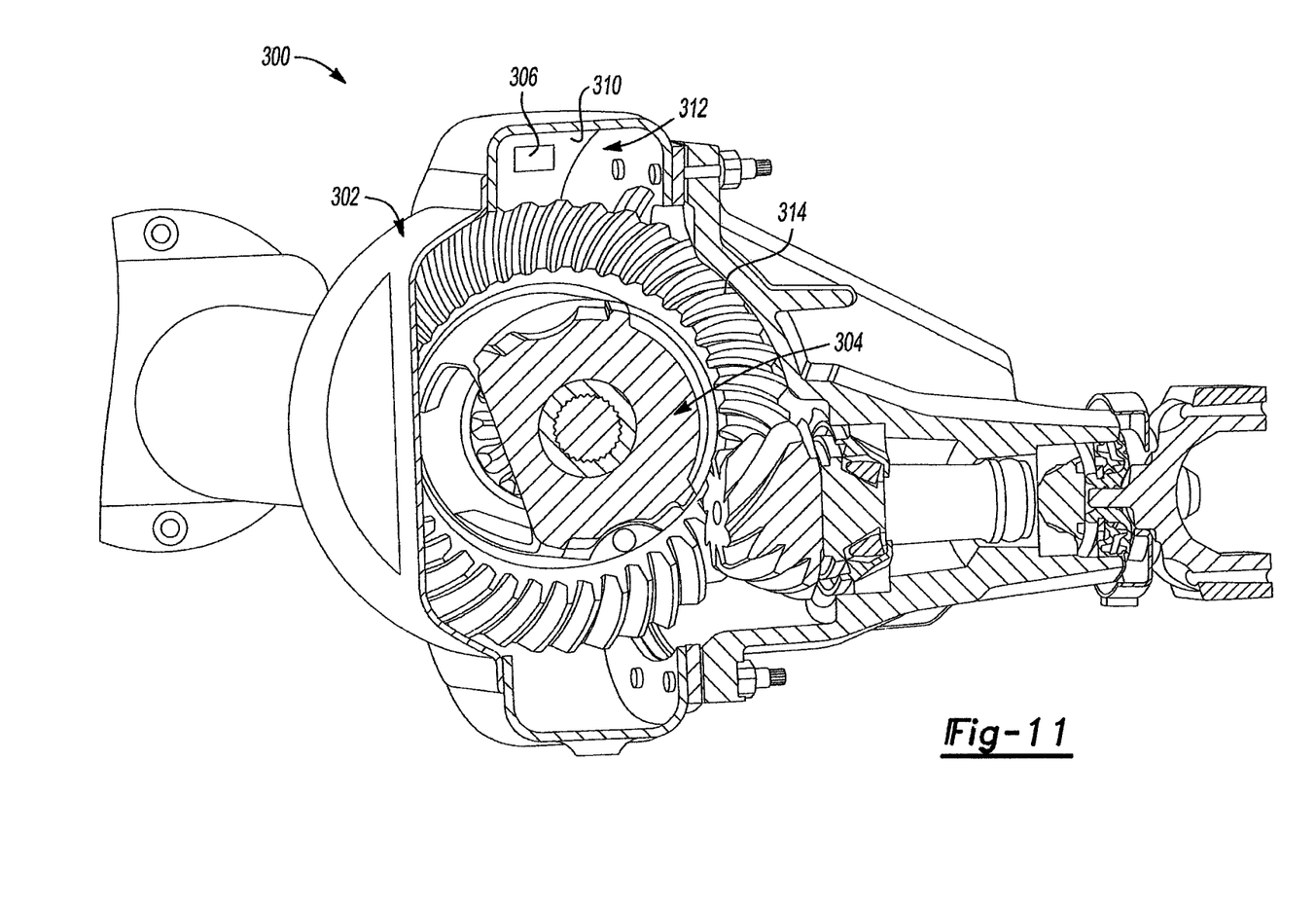
Figure 12:
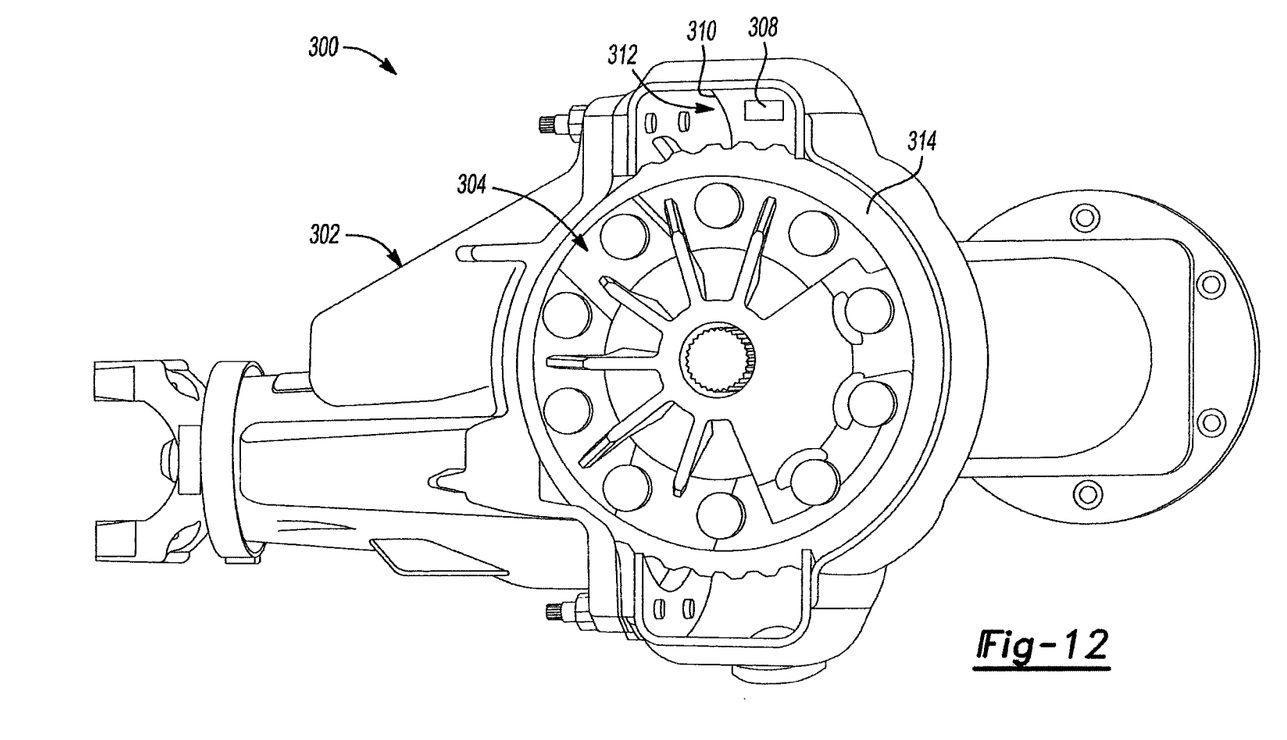
Figure 13:
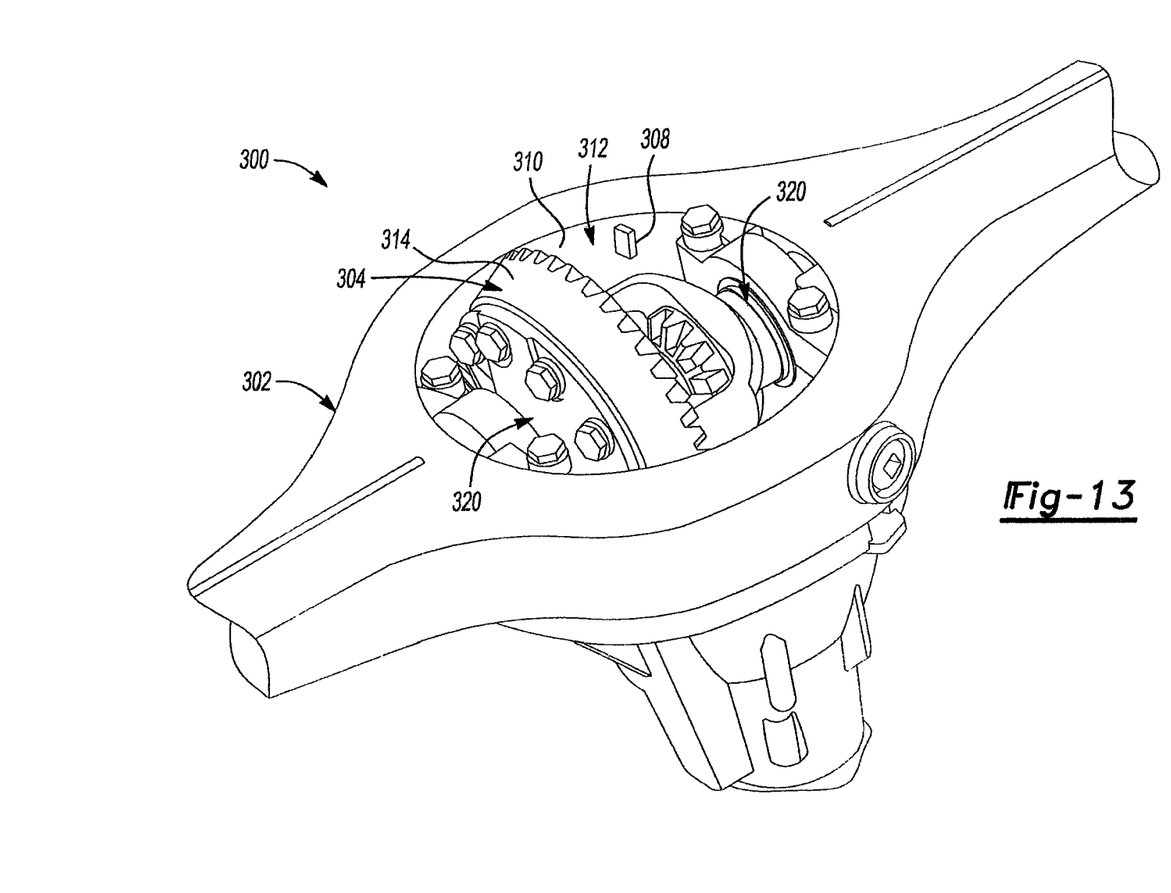

With reference to FIG. 9, in another embodiment of an axle assembly constructed in accordance with the teachings of the present disclosure, the carrier housing 54 can include an additional fluid deflector 170. The fluid deflector 170 can extend into the stream S2 and disperses a second portion of the stream S2 different than the first portion of the stream S2 into a spray S3' as shown. The fluid deflector 170 can be spaced apart from the fluid deflector 70 and can generate the spray S3' to provide additional coverage for, and thereby additional lubrication to, other components of the differential 42.

Features of the fluid deflector 170 can vary from the features of the fluid deflector 70. The features can be selected such that a third predetermined amount of the stream S2 is diverted by the fluid deflector 170, and such that the spray S3' has a predetermined shape, orientation, and coverage. The features can be selected such that the spray S3' has a pattern that covers portions of the differential 42 not covered by the pattern P1 of the spray S3. The fluid deflector 170 can be a tab-like structure similar to the fluid deflector 70, such as in the example provided, or can have a different structure having features similar to those described above with reference to the fluid deflector 70.

In still other embodiments according to the teachings of the present disclosure, the carrier housing 54 can include one or more fluid deflectors having features similar to the fluid deflectors 70, 170 that redirect and disperse at least a portion of a stream of lubricant flung onto and/or flowing along the interior surface 68 away from the interior surface 68 into a spray and/or stream. As one example, a fluid deflector 270 (FIG. 9) may be provided to disperse a portion of the stream S4 (or S4') into a spray that is directed away from the interior surface 68. The amount of lubricant diverted into the spray can depend on the speed and the mass flow rate of the fluid flowing along the interior surface 68. The fluid deflectors can provide an abrupt change in the contour of the interior surface 68 and direct the spray to a particular component of the differential 42, such as one of the bearings 116. In such embodiments, the fluid deflectors can be located outside of the stream S2 and closer to the particular component lubricated by the spray than the ring gear 80.

With reference to FIGS. 10-13, an exemplary embodiment of a banjo-style axle assembly 300 constructed in accordance with the teachings of the present disclosure is illustrated. The axle assembly 200 includes a housing 302, a differential 304, a first fluid deflector 306 and a second fluid deflector 308. The first and second fluid deflectors 306, 308 may have features similar to the fluid deflectors 70, 170. The first and second fluid deflectors 306, 308 can be coupled to the housing 302 in a desired manner and can extend from an interior surface 310 of the housing 302 into an internal cavity 312 defined by the housing 302. The first fluid deflector 306 may be laterally spaced to one side of a ring gear 314 of the differential 304 and may be oriented to face the ring gear 314 as shown. The second fluid deflector 308 may be laterally spaced to another side of the ring gear 314 opposite the first fluid deflector 306 and may also be oriented to face the ring gear 314.

More specifically, the first and second fluid deflectors 306, 308 may be oriented to redirect and disperse at least a portion of streams of lubricant S5 and S5', respectively, generated by lubricant flung onto and/or flowing along the interior surface 310. In this manner, the first and second fluid deflectors 306, 308 may disperse portions of the streams S5 and S5' away from the interior surface 310 into a spray and/or stream that is directed towards one or more components of the differential 304, such as differential bearings 320. The streams S5 and S5' may be generated during operation of the differential 304 and may flow laterally as shown based on the contour of the interior surface 310.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, while the axle assembly of the particular example illustrated in the drawings and described above is an independent rear drive axle assembly and a banjo axle assembly, those of ordinary skill in the art will appreciate that the teachings of the present disclosure have application to other types of axle assemblies, such as Salisbury axle assemblies.

Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power transmitting component comprising:
    a housing having an interior cavity and a deflector, the interior cavity having a sump, the deflector extending into the interior cavity and having a first face with an impingement portion and a first edge that is adjacent the impingement portion;
    a lubricant disposed in the sump; and
    an assembly received in the housing and being rotatable in the interior cavity about a first axis, wherein the assembly includes a component that travels through the lubricant as the assembly rotates within the housing;
    wherein the impingement portion of the deflector is sized and positioned to extend into a stream of lubricant that is slung from the component as it rotates at a speed in excess of a predetermined speed, the impingement portion being configured to deflect a portion of the stream towards the first edge, the first edge being configured to disperse at least a portion of the portion of the stream as a spray of fluid to one or more selected areas within the interior cavity.

2. The power transmitting component of claim 1, wherein the deflector includes a tab-like structure.

3. The power transmitting component of claim 1, wherein the assembly comprises a bearing and wherein one of the selected areas in the interior cavity is an area where lubricant collects and feeds into the bearing.

4. The power transmitting component of claim 1, wherein the assembly comprises a gear set and wherein one of the selected areas in the interior cavity is an area where lubricant can contact the gear set.

5. The power transmitting component of claim 4, wherein the gear set is received in a case and wherein the case has one or more windows through which the lubricant can pass prior to contacting the gear set.

6. The power transmitting component of claim 1, wherein the spray of fluid has a fan-shaped spray pattern.

7. The power transmitting component of claim 1, wherein the first face includes a flat surface.

8. The power transmitting component of claim 7, wherein the flat surface defines a plane that extends parallel to the first axis.

9. The power transmitting component of claim 1, wherein the first edge extends parallel to the first axis.

10. The power transmitting component of claim 1, wherein the first edge includes an arcuate portion extending from the first face.

11. The power transmitting component of claim 1, wherein the deflector extends along a radial line extending through the first axis.

12. The power transmitting component of claim 1, wherein the assembly comprises a differential.

13. The power transmitting component of claim 12, wherein the component is a ring gear.

14. A method for lubricating an assembly that is rotatably in a housing of a power transmitting component, the method comprising:
    rotating the assembly in the housing such that a component of the assembly rotates through a lubricant in a sump to generate a stream of lubricant that is slung from the component as the component rotates at a rotational speed that is greater than a predetermined rotational speed;
    deflecting a portion of the stream in a first path along a first face of a deflector coupled toward an interior surface of the housing, the first face extending into the stream, the first path being transverse to a second path of the portion of the stream when the stream first impinges the first face; and
    dispersing the portion of the stream into a spray with an edge of the deflector that adjoins the first face.

15. The method of claim 14, wherein the spray has a fan-shaped pattern.

16. The method of claim 14, wherein the dispersing the portion of the stream includes directing the portion of the stream towards the assembly.

17. The method of claim 14, wherein the assembly comprises a differential.

18. The method of claim 17, wherein the component comprises a ring gear.

* * * * *